United States Patent
Bösl

(10) Patent No.: US 12,158,392 B2
(45) Date of Patent: Dec. 3, 2024

(54) TEST RIG AND METHOD FOR TESTING VEHICLE TIRES

(71) Applicant: ZF Friedrichshafen AG, Friedrichshafen (DE)

(72) Inventor: Roland Bösl, Neuburg am Inn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/766,649

(22) PCT Filed: Oct. 20, 2020

(86) PCT No.: PCT/EP2020/079493
§ 371 (c)(1),
(2) Date: Apr. 5, 2022

(87) PCT Pub. No.: WO2021/078734
PCT Pub. Date: Apr. 29, 2021

(65) Prior Publication Data
US 2024/0060859 A1    Feb. 22, 2024

(30) Foreign Application Priority Data
Oct. 22, 2019 (DE) .................. 10 2019 216 215.0

(51) Int. Cl.
*G01M 17/02* (2006.01)
*G01L 5/167* (2020.01)
*G01L 5/20* (2006.01)

(52) U.S. Cl.
CPC .......... *G01M 17/022* (2013.01); *G01L 5/167* (2013.01); *G01L 5/20* (2013.01)

(58) Field of Classification Search
CPC .......... G01M 17/022; G01L 5/167; G01L 5/20
See application file for complete search history.

(56) References Cited

U.S. PATENT DOCUMENTS

| 3,927,561 A | 12/1975 | Schleimann |
| 4,134,292 A | 1/1979 | Honlinger et al. |

(Continued)

FOREIGN PATENT DOCUMENTS

| DE | 2 326 046 | 1/1974 |
| DE | 27 09 682 | 9/1978 |

(Continued)

OTHER PUBLICATIONS

German Patent Office, Search Report, German Patent Application No. 10 2019 216 215.0 (Jun. 24, 2020).

(Continued)

*Primary Examiner* — Jennifer Bahls
*Assistant Examiner* — Quang X Nguyen
(74) *Attorney, Agent, or Firm* — Finch & Maloney PLLC

(57) ABSTRACT

Disclosed is a test rig (1) for testing vehicle tires. In one embodiment, the test rig includes a rotating drum (2) on a drum axle (3) and force pick-ups (4, 5, 6) for the determination of a radial force acting on the drum axle (3) and a lateral force acting on the drum axle (3). In one embodiment, the test rig (1) has three uniaxial force pick-ups (4, 5, 6), such that a first and a second force pick-up (4, 5) are arranged so as to determine a radial force, where a third force pick-up (6) is arranged so as to determine a lateral force, and where the first force pick-up (4) and the third force pick-up (6) are coupled. Also disclosed is a method for testing vehicle tires.

19 Claims, 3 Drawing Sheets

(56) References Cited

U.S. PATENT DOCUMENTS

| | | | |
|---|---|---|---|
| 4,545,239 A | 10/1985 | Himmler et al. | |
| 2003/0061719 A1* | 4/2003 | Gerdes | G01M 17/022 33/203.13 |
| 2010/0064789 A1 | 3/2010 | Schraudolf et al. | |

FOREIGN PATENT DOCUMENTS

| | | | |
|---|---|---|---|
| DE | 32 31 852 | 8/1982 | |
| DE | 39 05 475 | 8/1990 | |
| DE | 10 260 000 | 7/2004 | |
| EP | 2793013 A1 * | 10/2014 | G01M 17/022 |

OTHER PUBLICATIONS

European Patent Office, Search Report, PCT Patent Application No. PCT/EP2020/079493 (Jan. 26, 2021).

European Patent Office, Written Opinion, PCT Patent Application No. PCT/EP2020/079493 (Jan. 26, 2021).

* cited by examiner

TEST RIG AND METHOD FOR TESTING VEHICLE TIRES

RELATED APPLICATIONS

This application claims the benefit under 35 U.S.C. § 371 as a U.S. National Application of application no. PCT/EP2020/079493, filed on 22 Oct. 2020, which claims benefit of German Patent Application no. 10 2019 216 215.0 filed 22 Oct. 2019, the contents of which are hereby incorporated herein by reference in their entireties.

FIELD OF THE DISCLOSURE

The present invention relates to a test rig for testing vehicle tires and a method for testing vehicle tires.

BACKGROUND

In the prior art so-termed "Low Speed Uniformity" test rigs are known for the determination of synchronization properties of vehicle tires. The synchronization properties in low-speed uniformity measurements include above all the determination and evaluation of forces during comparatively slow rolling of the vehicle tire, for example at about 60 tire revolutions per minute. The test rigs usually used for a vehicle tire to be tested comprise, in each case, two force pick-ups of biaxial design, which can determine forces respectively along two spatial directions. In that way, undefined cross-talk of forces between the two force determination channels associated with the different spatial directions can take place.

From DE 102 60 000 B4 a wheel force dynamometer for the measurement of tire forces is known, such that a vehicle wheel can be fixed on a wheel axle, which is mounted in a hollow shaft by means of roller bearings. The hollow shaft is mounted hydrostatically in a housing fixed on a frame. The wheel force dynamometer comprises at least two uniaxial force sensors associated with the wheel axle, such that a first force sensor is provided for the detection of a wheel load component and a second force sensor is provided for the detection of a tangential force fraction. The force sensors are not coupled with one another.

SUMMARY

During the measurement of tire forces by means of the known test rigs, measurement errors can occur which result from the design of the test rig.

A purpose of the present invention is to propose an improved test rig for the testing of vehicle tires.

According to the invention this objective is achieved by the test rig for testing vehicle tires according to the independent claims. Advantageous design features and further developments of the invention emerge from the dependent claims.

The invention relates to a test rig for testing vehicle tires, which comprises a rotating drum on a drum axle and force pick-ups for the determination of a radial force that acts upon the drum axle and a lateral force that acts upon the drum axle. The distinguishing feature of the test rig according to the invention is that the test rig has three uniaxial force pick-ups, namely a first and a second force pick-up for determining the radial force whereas a third force pick-up is arranged to determine the lateral force, and the first force pick-up and the third force pick-up are coupled.

Thus, according to the invention a test rig for testing vehicle tires is provided, which comprises a rotating drum arranged on a drum axle. Here, the rotating drum forms the rolling surface for the vehicle tires to be tested. Radial forces and lateral forces which act between the rotating drum and the vehicle tire being tested are picked up by means of three force pick-ups of the test rig. The three force pick-ups are three in each case uniaxial force pick-ups, i.e. force pick-ups designed to determine forces exclusively along a single spatial direction. This, for example, has the advantage that each force pick-up can be calibrated individually. The force pick-ups can for example be ones that work in accordance with the piezo principle. Two of the force pick-ups, namely the first and second force pick-ups, are arranged on the test rig or in contact with the drum axle in such manner that they can determine a radial force acting on the drum axle. The third force pick-up is arranged on the test rig or in contact with the drum axle in such manner that it can determine a force acting laterally on the drum axle. Furthermore, the first force pick-up, which can determine a radial force, and the third force pick-up, which can determine a lateral force, are coupled with one another so that when a force acts upon one of the two force pick-ups a controlled cross-talk takes place on the respective other force pick-up. When a radial force occurs, which among other things is detected by the first force pick-up, a cross-talk takes place at the third force pick-up so that this too detects a force. Conversely, when a lateral force occurs, which is detected by the third force pick-up, a cross-talk takes place at the first force pick-up so that this too detects a force.

This has the advantage that very accurate determination of the forces detected takes place with only three force pick-ups, since by coupling the first force pick-up with the third force pick-up and by virtue of the precisely adjusted cross-talk, additional information about the force determined by the first or the third force pick-up is obtained. This is particularly advantageous for the determination of the radial force, which is detected equally by the first or the second force pick-up. The additional information obtained by virtue of the precisely adjusted cross-talk can be used, for example, to compensate by computational means temperature influences on the measurement data of the first force pick-up. By contrast, in the prior art although there is often cross-talk between force pick-ups for different force directions in or between different force detection directions of a multi-axial force pick-up, this effect is undesired because it takes place in an undefined manner and therefore does not yield any usable information. However, the test rig according to the invention enables substantially exact calibration of each force pick-up and a calibration of the cross-talk from the first force pick-up to the third force pick-up, and conversely.

Since to determine the lateral force only a single force pick-up is provided, namely the third force pick-up, the influence of temperature variations also on the measurement result relating to the lateral force can advantageously be completely eliminated.

Preferably, it is provided that the first force pick-up is associated with a first axial end of the drum axle or is in contact with a first axial end of the drum axle, and the second force pick-up is associated with a second axial end of the drum axle or is in contact with a second axial end of the drum axle. In that way, radial forces acting on the rotating drum can be registered and determined particularly reliably. The radial forces are as a rule produced in that the vehicle tire to be tested is brought into contact with the rotating drum under the action of a specifiable radial force in the radial direction, i.e. with the radial force.

In a preferred embodiment of the invention, it is provided that the first force pick-up is in contact by way of a first coupling link with a first axial end of the drum axle and the second force pick-up is in contact by way of a second coupling link with a second axial end of the drum axle. This enables a largely optimal introduction of radial forces acting on the drum axle into the first and second force pick-ups. Thanks to the preferred, essentially flat and square design of the coupling links, torques too can be detected which are produced due to radial forces acting at different positions of the drum axle.

According to a particularly preferred embodiment of the invention, it is provided that the first coupling link is in contact with the first axial end of the drum axle by way of releasable screw connections and the second coupling link is in contact with the second axial end of the drum axle also by way of releasable screw connections. This has the advantage that both the first and the second coupling links can be detached from the respective first and second axial ends in a simple manner, for example in order to be changed or replaced so as to modify the structure of the test rig. Nevertheless, the screw connections ensure that the first and second coupling links are held securely onto the first and second axial ends. Furthermore, a hysteresis that often occurs in the prior art can be avoided in this way, since the screw connections are free from play.

In a further preferred embodiment of the invention, it is provided that the third force pick-up is in contact with the first axial end of the drum axle by way of a connecting rod. This has the advantage that although the third force pick-up can be arranged flexibly with a specifiable distance from the drum axle, it is nevertheless in contact with the drum axle so that it can determine the lateral force acting on the drum axle.

Preferably, in this case the connecting rod on the first axial end of the drum axle is arranged coaxially with the drum axle. This arrangement enables a largely optimum transmission of the lateral force acting on the drum axle to the third force pick-up.

According to a further, particularly preferred embodiment of the invention, it is provided that the third force pick-up is in contact by way of the connecting rod with the first coupling link. This has the advantage that by means of the connecting rod and the coupling link the cross-talk of the force pick-up with the third force pick-up can be adjusted precisely, and vice-versa.

Preferably the coupling link has an opening through which the connecting rod passes virtually without play. Thus, the connecting rod can be in contact on the one hand with the first axial end and on the other hand with the coupling link without play, and so without the occurrence of hysteresis effects.

In a further, particularly preferred embodiment of the invention, it is provided that the test rig is designed in such manner that by means of a specifiable length and/or a specifiable rigidity of the connecting rod, a defined cross-talk of the radial force on the third force pick-up can be set. This has the advantage that the extent of the cross-talk from the first force pick-up to the third force pick-up and vice-versa can be adjusted precisely and as necessary. The shorter and more rigid is the connecting rod, the more marked is the cross-talk from the first force pick-up to the third force pick-up and vice-versa.

Preferably, the defined cross-talk is additionally adjusted by a specifiable length and/or a specifiable rigidity of the first coupling link.

According to a further preferred embodiment of the invention, it is provided that the test rig is designed such that by means of different lengths of the first and/or second coupling links, a downward displacement of the rotating drum can be adjusted. By virtue of a length of the coupling links, in particular with different lengths of the first coupling link and the second coupling link, it is thus possible in a simple manner to adjust a downward displacement of the drum axle relative to the rotation axis of the vehicle tire being tested. This has the advantage that in a simple manner the vehicle wheel to be tested can be subjected to a variety of test scenarios.

In a further preferred embodiment of the invention, it is provided that the test rig is designed such that by means of a displacement of the first and/or the second force pick-up an oblique running direction of the rotating drum can be set. This has the advantage that in a simple manner, an oblique running direction of the drum axle relative to a rotation axis of the vehicle tire being tested can be set.

The invention also relates to a method for testing vehicle tires, in which by means of force pick-ups a radial force acting upon a drum axle of a rotating drum and a lateral force acting upon the drum axle of the rotating drum are determined. The distinguishing feature of the method according to the invention is that the radial force is determined by a first and a second uniaxial force pick-up, whereas the lateral force is determined by a third uniaxial force pick-up, and a defined cross-talk of the radial force on the third force pick-up is set. Thus, the method according to the invention describes the testing of a vehicle tire in a test rig according to the invention, with the advantages already described.

According to a preferred embodiment of the invention it is provided that the first force pick-up and/or the second force pick-up and/or the third force pick-up are calibrated individually. This has the advantage that, for example, temperature variations in the test environment, which can also affect the third force pick-up, cannot give rise to any change of the test results of the force pick-ups.

BRIEF DESCRIPTION OF THE DRAWINGS

Below, examples of the invention are explained with reference to the embodiments illustrated in the figures, which show.

The same objects, functional units and comparable components are denoted by the same indexes in all the figures. These objects, functional units and comparable components are identically designed as regards their technical features unless otherwise indicated explicitly or implicitly in the description.

DETAILED DESCRIPTION

Figure 1:
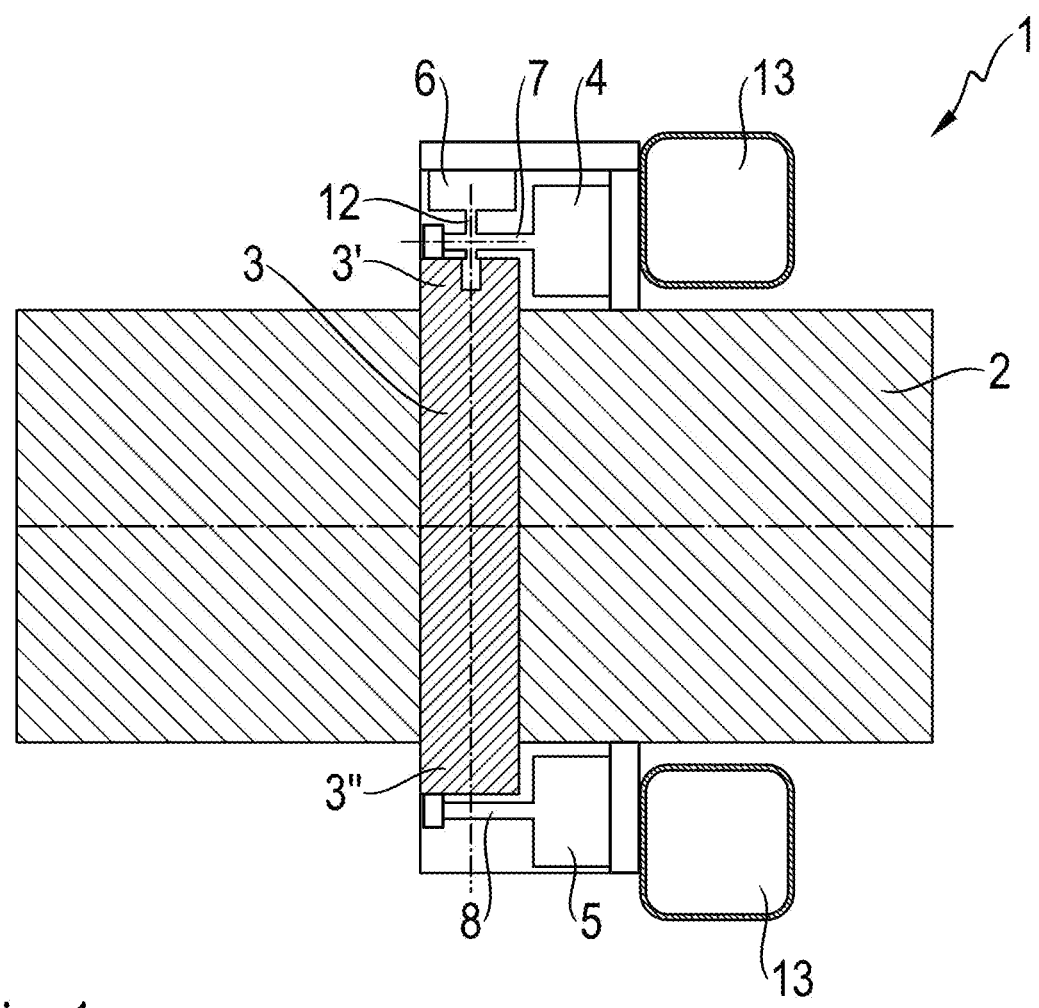
FIG. 1: An example of a possible embodiment of a test rig according to the invention, illustrated schematically.

FIG. 1 shows, as an example and schematically, a possible embodiment of a test rig 1 according to the invention. The test rig 1 comprises a rotating drum 2 arranged on a drum axle 3. In this case the drum axle 3 has three translational and three rotational degrees of freedom. A vehicle tire to be tested (not shown in FIG. 1) rolls during its testing on a surface of the rotating drum 2. Furthermore, the test rig 1 comprises a first force pick-up 4, a second force pick-up 5, and a third force pick-up 6. The first force pick-up 4 is in contact by way of a first coupling link 7 with a first axial end 3' of the drum axle 3 and the second force pick-up 5 is in contact by way of a second coupling link 8 with a second axial end 3" of the drum axle 3. For its part, the first coupling link 7 is in contact with the first axial end 3' of the drum axle 3 by way of releasable screw connections and for its part, the second coupling link 8 is in contact with the second axial end 3" of the drum axle 3 by way of releasable screw connections. Since the connections between the first and second coupling links 7, 8 and the first and second axial ends 3', 3", respectively, are thus free from play, hysteresis effects that falsify the test results can be avoided. Due to the arrangement of the first force pick-up 4 and the second force pick-up 5 respectively at the first axial end 3' and the second axial end 3" as shown, each of them can determine a radial force acting upon the drum axle 3. Moreover, by virtue of the flat, rectangular-shaped form of the coupling links 7, 8, a tangential force that may be acting on the rotating drum 2 can also be determined, in particular in combination with the connecting rod 12 and the third force pick-up 6. The third force pick-up 6 is arranged perpendicularly to the first force pick-up 4 and is in contact with the first axial end 3' of the drum axle 3 by way of a connecting rod 12. Thus, the third force pick-up 6 can detect a lateral force acting on the drum axle 3. In addition, the third force pick-up 6 is also in contact with the first force pick-up 4 by way of the connecting rod 12 and the first coupling link 7, so that a precise cross-talk from the first force pick-up 4 to the third force pick-up 6 and vice-versa can take place. Thanks to the arrangement of the third force pick-up 6 shown, it can determine a lateral force acting on the drum axle 3. The first force pick-up 4, the second force pick-up 5 and the third force pick-up 6 are in each case in the form of uniaxial force pick-ups, so that they are comparatively inexpensive and can above all be calibrated in a simple manner. In that way, an undesired and undefined cross-talk between force detection channels of a multi-axial force pick-up can be avoided in advance. The test rig 1 shown in FIG. 1 is suspended on a carrying frame 13.

Figure 2:
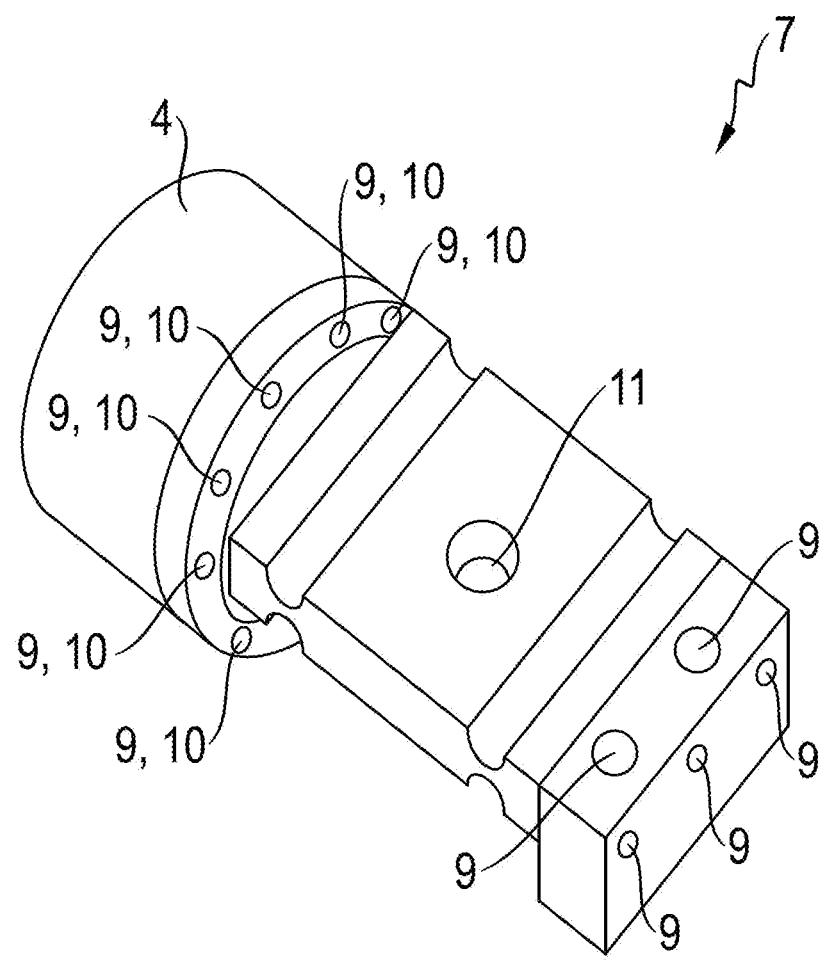
FIG. 2: An example of a possible embodiment of a coupling link, illustrated schematically.

FIG. 2 shows, as an example and schematically, a possible embodiment of a coupling link 7 as preferably used for a test rig according to the invention. As can be seen, the coupling link 7 comprises at each axial end a series of holes 9 that serve to receive screws 10 in order to fix the coupling link releasably by means of screw connections to the force pick-up 4 and to the first axial end 3' of the drum axle 3 (not shown in FIG. 2). In addition, the coupling link 7 has a central opening 11 through which the connecting rod 12 can be passed in order to enable precise cross-talk from the first force pick-up 4 to the third force pick-up 6, and conversely, to be set. The level of cross-talk depends both on the length and rigidity of the connecting rod 12 and on the length and rigidity of the coupling link 7.

Figure 3:
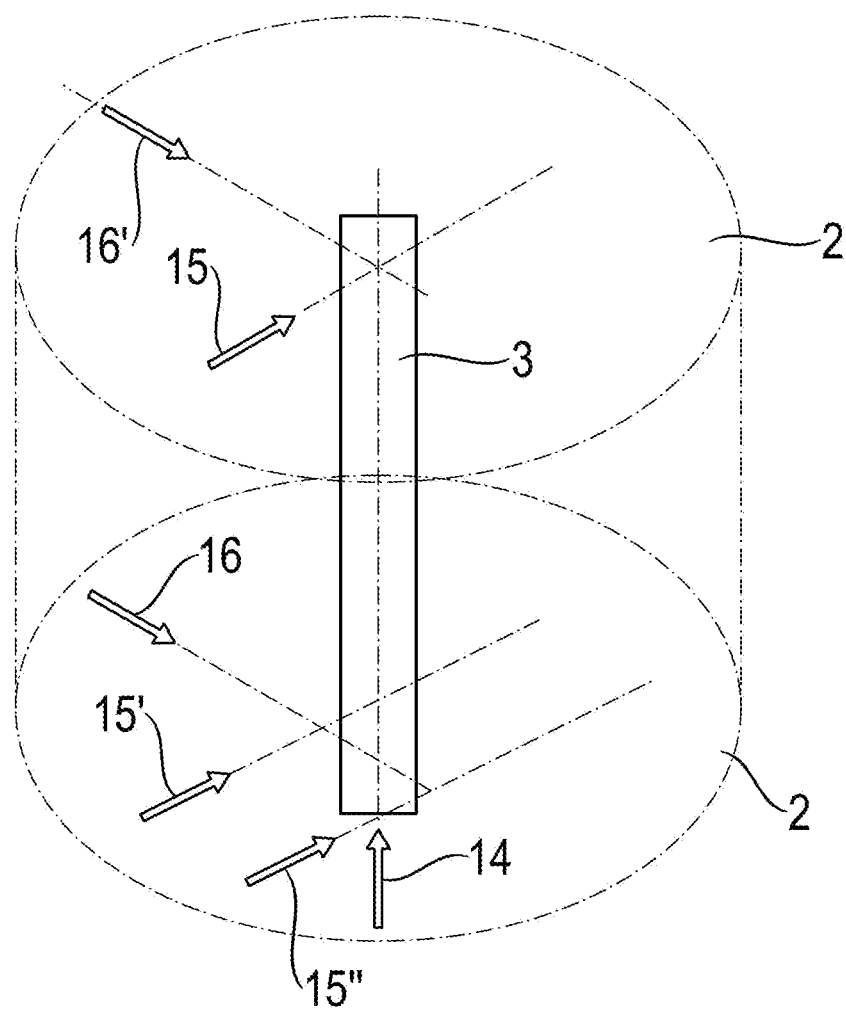
FIG. 3: An example of a drum axle of a test rig according to the invention, illustrated schematically.

FIG. 3 shows, as an example and schematically, a drum axle 3 of a test rig according to the invention. The rotating drum 2 is also indicated by dot-dash lines. An arrow 14 represents a lateral force acting on the drum axle, which force can be determined via the connecting rod 12 by the third force pick-up. Arrows 15, 15' and 15" represent radial forces which can be determined via the first and second coupling links 7 and 8 by the first and second force pick-ups 4 and 5. Since the arrows 15, 15' 15" or the associated radial forces act on the drum axle 3 at three different positions, a torque acting on the drum axle 3 is also produced. In turn, this torque can be detected by the first and second force pick-ups 4, 5 by way of the first and second coupling links 7, 8, and by virtue of the coupling of the first coupling link 6 to the connecting rod 12, also determined by the third force pick-up 6. Arrows 16, 16' represent tangential forces which, owing to the flat, square form of the first and second coupling links 7, 8, can also be determined by the first and second force pick-ups 4, 5.

INDEXES

1 Test rig
2 Rotating drum
3 Drum axle
3' First axial end of the drum axle
3" Second axial end of the drum axle
4 First force pick-up
5 Second force pick-up
6 Third force pick-up
7 First coupling link
8 Second coupling link
9 Hole
10 Screw
11 Opening
12 Connecting rod
13 Carrying frame
14 Lateral force
15, 15', 15" Radial force
16, 16' Tangential force

The invention claimed is:

1. A test rig for testing vehicle tires, comprising:
a rotating drum on a drum axle;
a first force pick-up and a second force pick-up configured and arranged to determine a radial force acting on the drum axle;
a third force pick-up is arranged to determine a lateral force acting on the drum axle; and
wherein the first, second, and third force pick-ups are uniaxial and wherein the first force pick-up is connected to the third force pick-up by way of a connecting rod.

2. The test rig according to claim 1, further comprising: a first coupling link and a second coupling link wherein the first force pick-up is in contact with a first axial end of the drum axle by way of the first coupling link and the second force pick-up is in contact with to a second axial end of the drum axle by way of the second coupling link.

3. The test rig according to claim 2, wherein the test rig is configured to set an oblique running direction of the rotating drum by displacement of the first and/or the second force pick-up.

4. The test rig according to claim 2, wherein the first coupling link is in contact with the first axial end of the drum axle by way of releasable screw connections and the second coupling link is contact with the second axial end of the drum axle by way of releasable screw connections.

5. The test rig according to claim 2, wherein the third force pick-up is in contact with the first axial end of the drum axle by way of the connecting rod.

6. The test rig according to claim 5, wherein the test rig is configured to set a defined cross-talk of the radial force with the third force pick-up based on a specified length and/or a specified rigidity of the connecting rod.

7. The test rig according to claim 6, wherein the test rig is configured to adjust a displacement of the rotating drum relative to a rotation axis of the drum axle, by virtue of a length of the first coupling link and/or a length of the second coupling links.

8. The test rig according to claim 1, wherein the third force pick-up is in contact with the first axial end of the drum axle by way of the connecting rod.

9. A test rig for testing vehicle tires, comprising:
a rotating drum on a drum axle;
a first force pick-up and a second force pick-up configured and arranged to determine a radial force acting on the drum axle;
a third force pick-up is arranged to determine a lateral force acting on the drum axle; and
wherein the first, second, and third force pick-ups are uniaxial, wherein the first force pick-up is coupled to a first coupling link, wherein the third force pick-up is in contact with the first coupling link by way of a connecting rod, and wherein the third force pick-up is in contact with the first axial end of the drum axle by way of the connecting rod.

10. The test rig according to claim 9, wherein the test rig is configured to adjust a displacement of the rotating drum by virtue of a difference between a length of the first coupling link and/or a length of the second coupling links.

11. The test rig according to claim 1, wherein the test rig is configured to set an oblique running direction of the rotating drum by displacement of the first and/or the second force pick-up.

12. A method for testing vehicle tires, the method comprising:
providing a test rig comprising a rotating drum on a drum axle and force pick-ups for the determination of a radial force acting on the drum axle and a lateral force acting on the drum axle;
determining a radial force acting on the drum axle of the rotating drum by means of first and second uniaxial force pick-ups;
determining a lateral force acting on a drum axle of a rotating drum by means of a third uniaxial force pick-up; and
communicating the lateral force and the radial force between the first uniaxial force pick-up and the third uniaxial force pick-up by way of a connecting rod directly connected to a first coupling link, wherein the first uniaxial force pick-up is directly connected to the first coupling link and the third uniaxial force pick-up is directly connected to the connecting rod.

13. The method according to claim 12, further comprising calibrating the first force pick-up, the second force pick-up, and/or the third force pick-up.

14. The method according to claim 13, wherein calibrating is performed individually for the first force pick-up, the second force pick-up, and/or the third force pick-up.

15. The method according to claim 12, further comprising:
adjusting a displacement of the rotating drum relative to a rotation axis of the drum axle, by selecting a length of the first coupling link and/or a length of a second coupling links.

16. The method according to claim 12, further comprising:
setting an oblique running direction of the rotating drum by selecting a displacement of the first and/or the second force pick-up.

17. The method according to claim 12, further comprising:
coupling the first force pick-up to a first axial end of the drum axle by way of the first coupling link; and
coupling the second force pick-up to a second axial end of the drum axle by way of a second coupling link.

18. The method according to claim 12, further comprising:
coupling the third force pick-up to the first axial end of the drum axle by way of the connecting rod.

19. The method according to claim 18, further comprising:
setting a cross-talk of the radial force with the third force pick-up by specifying a length and/or a rigidity of the connecting rod.

* * * * *

UNITED STATES PATENT AND TRADEMARK OFFICE
CERTIFICATE OF CORRECTION

PATENT NO. : 12,158,392 B2
APPLICATION NO. : 17/766649
DATED : December 3, 2024
INVENTOR(S) : Roland Bösl Page 1 of 1

It is certified that error appears in the above-identified patent and that said Letters Patent is hereby corrected as shown below:

In the Claims

In Claim 10, Column 7, Line 21, delete "/or".

Signed and Sealed this
Eleventh Day of March, 2025

Coke Morgan Stewart
*Acting Director of the United States Patent and Trademark Office*